United States Patent [19]

Johnson

[11] 4,348,153
[45] Sep. 7, 1982

[54] ROCK BOX

[76] Inventor: Ardell W. Johnson, Rte. #2, Lake Lillian, Minn. 56253

[21] Appl. No.: 214,912

[22] Filed: Dec. 10, 1980

[51] Int. Cl.³ .............................................. B60P 1/22
[52] U.S. Cl. ................... 414/786; 298/17 T; 298/19 V; 414/424; 414/680
[58] Field of Search ............... 414/420, 422, 423, 424, 414/680, 714, 743, 786, 920; 280/760; 298/1 C, 17 T, 19 V, 22 F

[56] References Cited

U.S. PATENT DOCUMENTS

| 2,150,821 | 3/1939 | Dempster | 414/424 |
| 2,290,738 | 7/1942 | Chadwick | 414/424 X |
| 2,829,787 | 4/1958 | Kalaus | 414/687 |
| 3,462,030 | 8/1969 | Allen | 414/424 |
| 3,847,436 | 11/1974 | Reid | 298/1 C |

Primary Examiner—Leslie J. Paperner
Attorney, Agent, or Firm—S. Pal Asija

[57] ABSTRACT

A rock box which mounts in front of a farm tractor and is suitable for loading, transporting and dumping rocks. The rock box can be lowered, tilted and raised by a single hydraulic cylinder and can be operated from the operator's seat of the farm tractor. Levers are provided to apply hydraulic cylinder action directly to raise or lower the rock box of this invention to the ground level. A chain is provided to transpose linear action of said cylinder into tilt or rotary action for unloading the contents of said rock box. Control connections are provided to control the rock box movements from inside the tractor cab.

2 Claims, 5 Drawing Figures

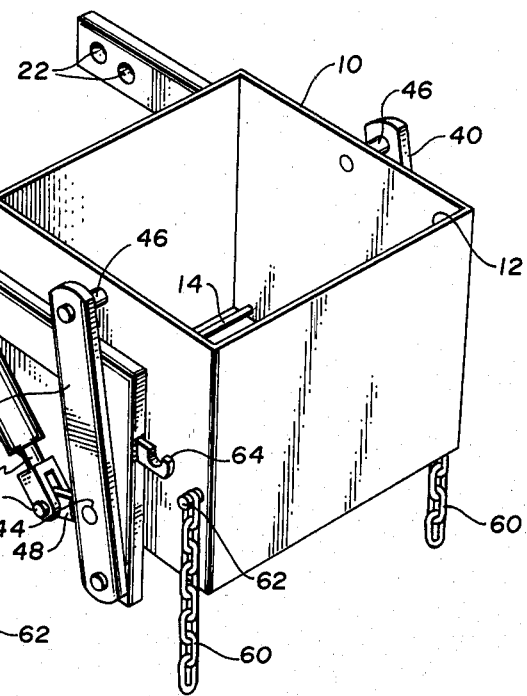
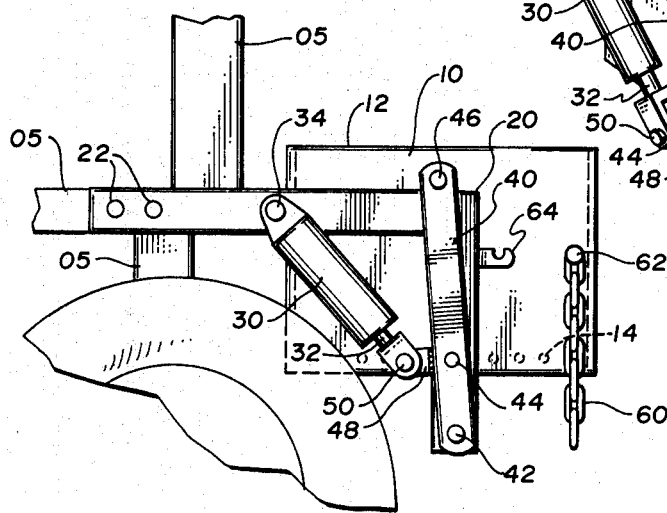
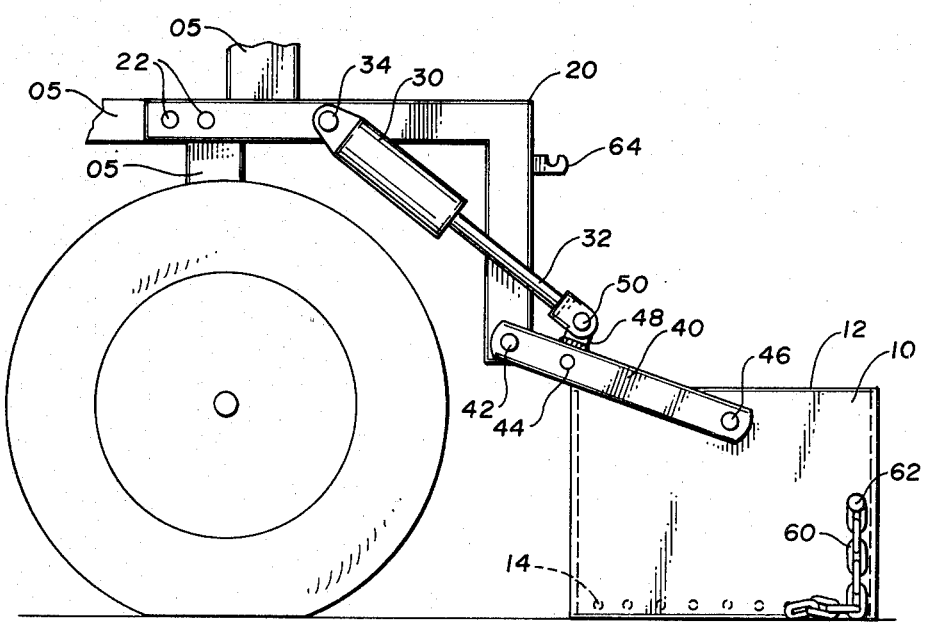

ROCK BOX

SUMMARY

This is a substitute application to Ser. No. 865,713 dated Dec. 29, 1977, now abandoned.

The section delineates the need, the prior art and the objectives of the Rock box of this invention. Farmers encounter each year new rocks in the ground during plowing which can damage the tractor and other farm equipment, e.g., combine, and therefore must be removed conveniently at low cost. Apparently these rocks rise a few inches every year by a phenomenon not too well understood by the inventor, except that it is connected with seasons particularly the freezing and thawing cycle. At any rate new rocks that surface each year must be removed. Applicant's invention provides a convenient and affordable means for rolling the rocks into the Rock box, transporting and unloading them.

A patent search was conducted. The prior art devices such as loaders are too complex, bulky and expensive to suit the needs of a country farmer. Following are some of the examples of the prior art. U.S. Pat. Nos. Dempster 2,250,821, Brooks 2,200,020, Dempster 2,281,183, Chadwick 2,290,738, Jones 2,702,142, Jones 3,009,591, Allen 3,462,030, Monson 3,613,924.

To overcome the limitations of the prior art following are some of the objectives of the applicant's invention.

(a) It is an object of this invention to provide a simple and affordable means for removing rocks from the ground.

(b) Another object of this invention is that the Rock box of this invention can be mounted in front of a farm tractor conveniently and expeditiously.

(c) Another object of this invention is that is can be operated hydraulically with a single cylinder from within the cab of the tractor.

(d) Another object of this invention is that it saves energy by minimizing the number of trips required to remove rocks using this apparatus on the front and the farming equipment on the back of the tractor, at the same time.

(e) Another object of this invention is that it minimizes the strain on the back of the farmer and therefore minimizes the risk of bad back by obviating the need for lifting rocks to the chest level.

(f) Another object of this invention is that it serves as a stabilizer for the tractor.

(g) Another object of this invention is that the Rock box of this invention does not rattle in transit.

(h) Another object of this invention is that it can be easily fastened and detached from the tractor without any damage to the tractor.

(i) Other objects of the Rock box of this invention will become apparent as the following description proceeds and the features of novelty which characterize the invention will be pointed out with particularity in the claims annexed to and forming a part of this specification.

BRIEF DESCRIPTION OF THE DRAWING

FIG. 1 is a perspective view of the Rock box of this invention prior to mounting on a tractor.

FIG. 2 is a side view of the rock box mounted in front of the farm tractor in an upright position.

FIG. 3 is a side view of the mounted Rock box when lowered to the ground level.

DETAILED DESCRIPTION OF THE PREFERRED EMBODIMENT

Figure 4:
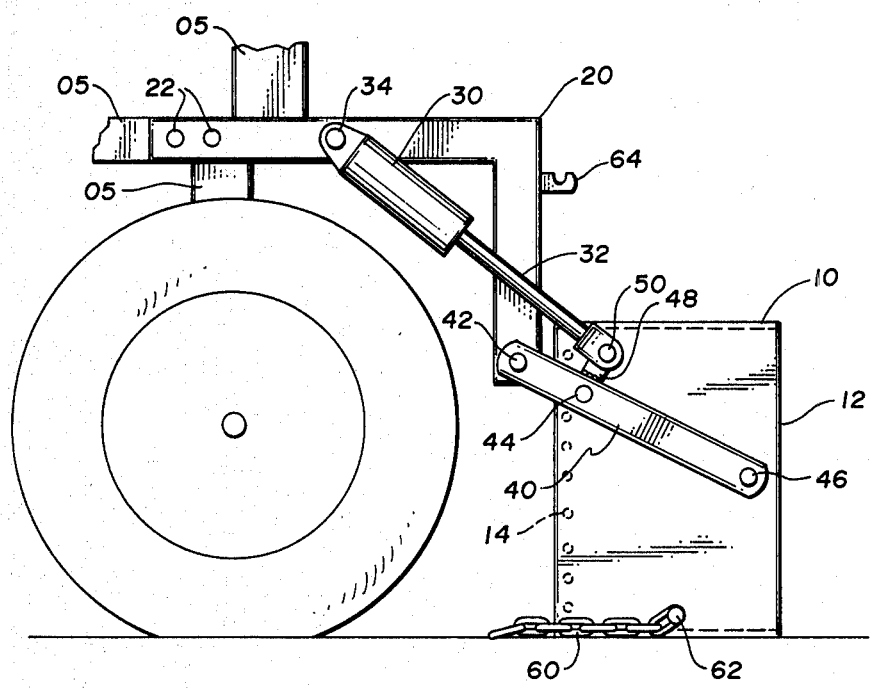
FIG. 4 is a side view of the mounted rock box in its lowered and tilted position ready for rolling the rock into the Rock box manually.

Rock loading, transporting the dumping apparatus of this invention mounts in front of a farm tractor and comprises a box 10, right angled brackets 20, a hydraulic cylinder 30, plurality of elevation arms 40, a chain 60 and a hook 64. The preferred embodiment is constructed and mounted on the frontal part of the tractor 05 by connecting two right angled brackets 20 one on each side of the tractor with fasteners 22. Similarly two elevation arms 40 are connected to the other ends of brackets 20 via axle 42 to form a fulcrum on each side of the tractor. The Rock box 10 is then suspended between other ends of said elevation arms 40 with axles 46. A single hydraulic cylinder 30 is then connected on one side of the tractor by fastening piston end 32 to elevation arm 40 via a bracket 48 with an axle 50 so as to form a fulcrum. The other end of the cylinder 30 is connected to right angled bracket 20 with an axle 34. A chain 60 is connected to box 10 permanently with a fastner 62. A hook 64 is connected to right angled bracket 20 at a distance such that the other end of the chain 60 can be connected to said hook 64. Hydraulic connections are made between the cylinder and the cab or operator's control box as per instructions provided by the manufacturer of the cylinder. Plurality of support rods 14 are added to the base of Rock box 10 for strength such that a single 3 and a hald inch by 8 inch cylinder can lift a 2 feet by 2 feet by 20 inch box full of rocks quite easily.

Following is a listing of the components used in the preferred embodiment along with their typical value or trade names where applicable arranged in the ascending order of the reference numerals.

05—Frontal part of the farm tractor
10—Rock box
12—Open side of the rock box
14—Support rods for base of Rock box 10
20—Mounting bracket
22—Fastners
30—Cylinder, hydraulically driven such as International Harvester Standard Model with 8" travel and 3½" diameter
32—Piston
34—Axle connecting cylinder 30 to right angled bracket 20
40—Elevation arm
42—Axle connecting right angled bracket 20 to elevation arm 40
44—Fastners
46—Axle connecting elevation arm 40 to rock box 10
48—Elevation bracket
50—Axle connecting piston 32 to adjustable bracket 48
60—Chain
62—Fixed end of chain on Rock box 10 hook on bracket 20

OPERATION

FIGS. 2 through 5 are particularly helpful in understanding the operation of the apparatus of this invention, which may be divided into mounting, loading, transporting and dumping.

Mounting and unmounting is accomplished by fasteners 22 between frontal part of the tractor 05 and right angled brackets 20. The relative position is dictated by the height of the farm tractor vis a vis the size of the Rock box and associated components selected.

Assuming originally the box is in the upright position as shown in FIG. 2, then the loading is accomplished merely by advancing the piston from the cylinder, which in turn lowers the rock box to the ground level with open side 12 at the top. The rocks can be now loaded manually. If the rock is too heavy for manual loading then alternatively loading by rolling technique may be employed by advancing the tractor toward the rock, which first tips the Rock box so as to turn open side 12 towards the rock and then slides up to the rock. The rock is then manually rolled on. This position is shown in FIG. 4. By retracting the piston into the cylinder the Rock box can be raised to normal position of FIG. 2.

In this position the rocks can be transported to the desired location. Due to the weight of the rocks and the box the combination acts as a stabilizer for the rock box.

Figure 5:
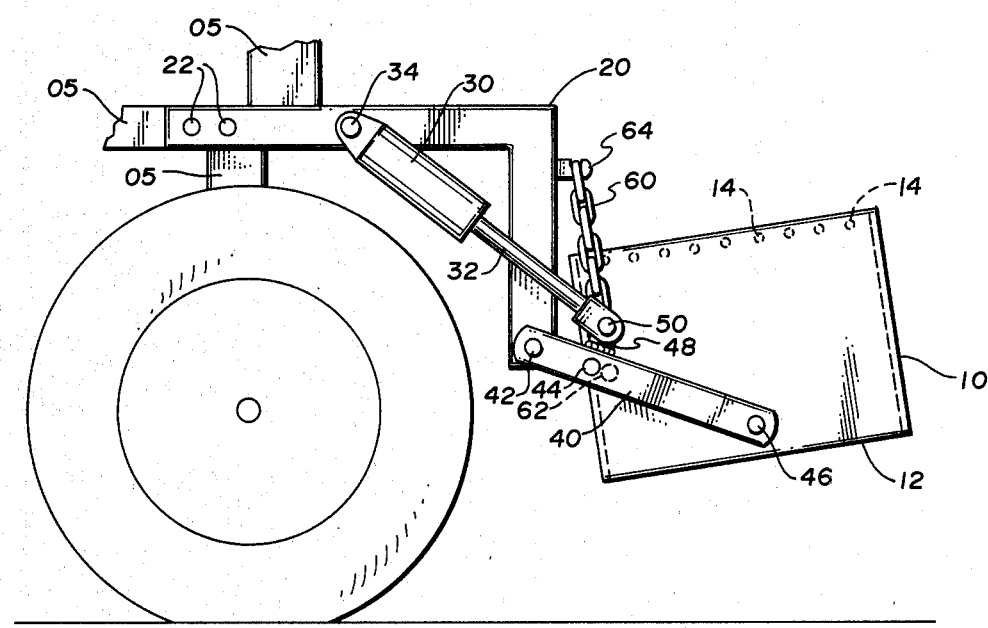
FIG. 5 is a side view of the mounted Rock box in its upside down, somewhat raised dumping position.

Unloading or dumping of the rocks is then accomplished by connecting chain 60 to hook 64 and then advancing the piston out of the cylinder, as shown in FIG. 5. The chain is then unhooked before retracting the piston into the cylinder which brings the apparatus back to normal position as shown in FIG. 2.

As can be evidenced from the above operation the Rock box does not interfere with normal operation of the tractor and instead provides additional stability to the tractor. Furthermore the apparatus of this invention can be conveniently mounted and unmounted merely by affixing or removing fasteners 22.

This has been the description of an embodiment of this invention. Many changes may be made to this apparatus without deviating from the spirit of this invention. As for example instead of a single hydraulic cylinder, plurality of differently powered mechanisms for lowering and raising the Rock box may be used. This mounting bracket need not be necessarily 90 degrees. Accordingly what the applicant claims new and desires to protect by U.S. Letters Patent follows.

The applicant claims:

1. A method of loading, transporting and dumping farm rocks conveniently and economically comprising the steps of:
(a) fastening a rock box to the frontal part of a farm tractor in upright position wherein said rock box including plurality of mounting brackets, plurality of elevation arms, a single hydraulic cylinder and a chain and a hook arrangement;
(b) making the hydraulic connections between said hydraulic cylinder and the operator's controls of said farm tractor via hydraulic systems of said farm tractor;
(c) lowering said rock box to the ground level by advancing piston out of said cylinder;
(d) rolling rock box 90 degrees by advancing said farm tractor;
(e) advancing said rock box up to the rock by advancing tractor,
(f) loading the rock into the box manually
(g) rotating said rock box to upright position by retracting the piston of said hydraulic cylinder;
(h) transporting the farm tractor to dump location;
(i) connecting said chain to said hook;
(j) dumping the contents of said rock box by advancing the piston out of said hydraulic cylinder;
(k) withdrawing the piston into said hydraulic cylinder to bring said rock box to upright position;
(l) raising said rock box to upright position; and
(m) unhooking said chain from said hook.

2. A method of loading, transporting and dumping farm rocks conveniently and economically, of claim 1 wherein step (f) is performed by nudging and sliding one side of said rock box beneath the rock by advancing and nudging the tractor against said rock.

* * * * *